United States Patent
Kuttanna et al.

(10) Patent No.: US 7,451,295 B2
(45) Date of Patent: *Nov. 11, 2008

(54) EARLY DATA RETURN INDICATION MECHANISM FOR DATA CACHE TO DETECT READINESS OF DATA VIA AN EARLY DATA READY INDICATION BY SCHEDULING, RESCHEDULING, AND REPLAYING OF REQUESTS IN REQUEST QUEUES

(75) Inventors: Belliappa Kuttanna, Austin, TX (US); Robert G. Milstrey, Citrus Heights, CA (US); Stanley J. Domen, Granite Bay, CA (US); Glenn Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,289

(22) Filed: Sep. 28, 2006

(65) Prior Publication Data
US 2007/0028048 A1 Feb. 1, 2007

Related U.S. Application Data

(63) Continuation of application No. 10/676,446, filed on Sep. 30, 2003, now Pat. No. 7,111,153.

(51) Int. Cl.
*G06F 9/30* (2006.01)
*G06F 12/00* (2006.01)
(52) U.S. Cl. .................. 712/216; 710/36; 711/154; 711/118; 711/122; 713/502

(58) Field of Classification Search .............. 712/216, 712/207; 710/36; 713/502; 711/154, 118, 711/137, 213, 144, 145, 140, 167, 168, 169, 711/156, 122
See application file for complete search history.

(56) References Cited

U.S. PATENT DOCUMENTS 5,454,107 A * 9/1995 Lehman et al. ............. 711/153

(Continued)

FOREIGN PATENT DOCUMENTS

WO WO 9637830 11/1996

OTHER PUBLICATIONS

U.S. Appl. No. 09/966,957, filed Sep. 27, 2001, Aboulenein et al.

(Continued)

*Primary Examiner*—Hong Kim
(74) *Attorney, Agent, or Firm*—Blakely, Sokoloff, Taylor & Zafman LLP

(57) ABSTRACT

One embodiment of a method is disclosed. The method generates requests waiting for data to be loaded into a data cache including a first level cache (FLC). The method further receives the requests from instruction sources, schedules the requests, and then passes the requests on to an execution unit having the data cache. Further, the method checks contents of the data cache, replays to the requests if the data is not located in the data cache, and stores the requests that are replay safe. The method further detects the readiness of the data of bus clocks prior to the data being ready to be transmitted to a processor, and transmits an early data ready indication to the processor to drain the requests from a resource scheduler.

11 Claims, 7 Drawing Sheets

U.S. PATENT DOCUMENTS

| | | | |
|---|---|---|---|
| 5,586,286 A * | 12/1996 | Santeler et al. ............. 711/105 |
| 5,652,856 A | 7/1997 | Santeler et al. |
| 5,752,269 A | 5/1998 | Divivier et al. |
| 5,809,550 A | 9/1998 | Shukla et al. |
| 5,961,621 A | 10/1999 | Wu et al. |
| 6,009,488 A | 12/1999 | Kavipurapu |
| 6,032,231 A | 2/2000 | Gujral |
| 6,094,717 A | 7/2000 | Merchant et al. |
| 6,115,791 A | 9/2000 | Collins et al. |
| 6,687,809 B2 | 2/2004 | Chowdhury et al. |
| 6,735,688 B1 * | 5/2004 | Upton et al. ................ 712/218 |
| 6,748,513 B1 | 6/2004 | Rajappa et al. |
| 6,877,086 B1 | 4/2005 | Boggs et al. |
| 6,912,648 B2 * | 6/2005 | Hammarlund et al. ...... 712/219 |
| 6,941,425 B2 | 9/2005 | Osborne |
| 6,952,764 B2 | 10/2005 | Sager et al. |
| 6,981,129 B1 | 12/2005 | Boggs et al. |
| 7,047,397 B2 * | 5/2006 | Segelken .................... 712/221 |
| 7,095,850 B1 * | 8/2006 | McGrew ...................... 380/42 |
| 2003/0126406 A1 * | 7/2003 | Hammarlund et al. ...... 712/200 |
| 2003/0149865 A1 * | 8/2003 | Kadambi ..................... 712/244 |

OTHER PUBLICATIONS

U.S. Appl. No. 10/212,548, filed Aug. 5, 2002, Rosenbluth et al.
U.S. Appl. No. 10/264,115, filed Oct. 3, 2002, Chaudhari et al.

* cited by examiner

EARLY DATA RETURN INDICATION MECHANISM FOR DATA CACHE TO DETECT READINESS OF DATA VIA AN EARLY DATA READY INDICATION BY SCHEDULING, RESCHEDULING, AND REPLAYING OF REQUESTS IN REQUEST QUEUES

RELATED APPLICATION

This application is a continuation application of U.S. application Ser. No. 10/676,446, filed on Sep. 30, 2003, no U.S. Pat. No. 7,111,153, issued on Sep. 19, 2006, and priority is claimed thereof.

This invention generally relates to computer processors and more particularly, to reducing data load latency in processors by using early data return indication.

DESCRIPTION OF RELATED ART

As computers systems continue to advance and become more complex, effective and efficient data transfer between various components of the computer systems has become more and more critical in computer system design and implementation. In particular, considerable effort and research has been focused on reducing and/or hiding memory latency in computer and network systems in order to improve processor and overall system performance. For example, many processors speculatively execute streams of instructions including speculatively retrieving load data from memory. In addition, some processors implement data speculation, in which the processor assumes that the correct data operands are available in the innermost cache. The processor verifies the assumption in parallel to instruction execution before committing the result to architecture state. Despite the efforts to reduce memory latency, high latency remains a major concern and one of the barriers to realizing faster and more efficient processors.

FIG. 1A is a block diagram illustrating a conventional prior art data speculation routine. After fetching at the fetch stage 102 and decoding at the decode stage 104, data speculation transaction begins at the execution phase 106, in which a request is made for data for an instruction or load micro-operation (load or load uops). The execution phase 106 may include accessing the first level cache (FLC) for the referenced data. A replay controller/checker (checker) 108 may be used to verify the contents of the FLC by doing FLC lookup 110. If the checker 108 determines the execution stage 106 received invalid data from the FLC, the execution results are discarded, and the execution is retried with data from the second level cache (SLC). The checker 108 may then verify the contents of the SLC by doing SLC lookup 112. If the checker determines the execution stage received invalid data from the SLC, the execution results are discarded and the execution is retried with data from the main system memory with memory lookup 114. When the checker 108 determines the request has received valid data, the request moves to the writeback phase 116 and then to the retire stage 118.

FIG. 1B is a block diagram illustrating a conventional prior art external transaction behavior of a request. The external behavior of the request includes, for example, a data load that misses the SLC. The transaction begins by making an external bus request at the request phase 122. The transaction then enters the snoop phase 124 during which cache coherency is maintained throughout the system. Some time later, the memory controller of the system has the requested data available, which it indicates to the processor at the response phase 126. The actual data is transmitted to the processor during the data phase 128. The processor then loads the data into internal caches (e.g., FLC and SLC).

For load operations that miss both the FLC and the SLC, the data is filled into the FLC, and the checker 108 determines that the request has received valid data. However, until the data is filled into the FLC, the request (e.g., load micro-operation) is replayed continuously resulting in significant power dissipation and waste of execution bandwidth. Furthermore, following requests may depend upon the results of this load for correct operation. The checker 108 determines these requests are dependent upon the uncompleted load request and directs the request to be replayed. For example, typical latency may be about 500 core clocks, which means replaying of the request may be made every 20 core clocks, resulting in nearly 25 replays before the data is ready to be filled into the FLC. Stated differently, a typical load request may consume about 20 bus clocks between initiation of the execution stage 106 and the writeback phase 116.

FIG. 1C is a block diagram illustrating a conventional prior art external transaction behavior of a request. To reduce the power dissipation and execution bandwidth waste, rescheduled request queue (RRQ) was introduced, illustrated as RRQ status 120. The RRQ status 120, which may be performed in parallel with the request phase 122, includes removing from the replay loop (e.g., after 3 loops) those loads that missed the SLC and inserting them into the RRQ. Since true dependent uops of the missing load may be difficult to identify, all requests (e.g., loads) that are newer than the missing load may be inserted into the RRQ.

At response phase 126, an RRQ wakeup protocol receives a data ready (DRDY) indication from the bus interface unit when the data is ready, triggering the RRQ draining. Although the use of RRQ may reduce replay re-executions, latency delay, i.e., the time between when the request for data is made and until the request is satisfied, is still high, as the data placed in the FLC (i.e., the data received from the memory) stays there for a long time until the request from the RRQ is finally returned to the execution unit. Furthermore, additional core clocks may be required to vaporize the core unit, drain RRQ, and re-execute the loads, further contributing to lower processor performance.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1A:
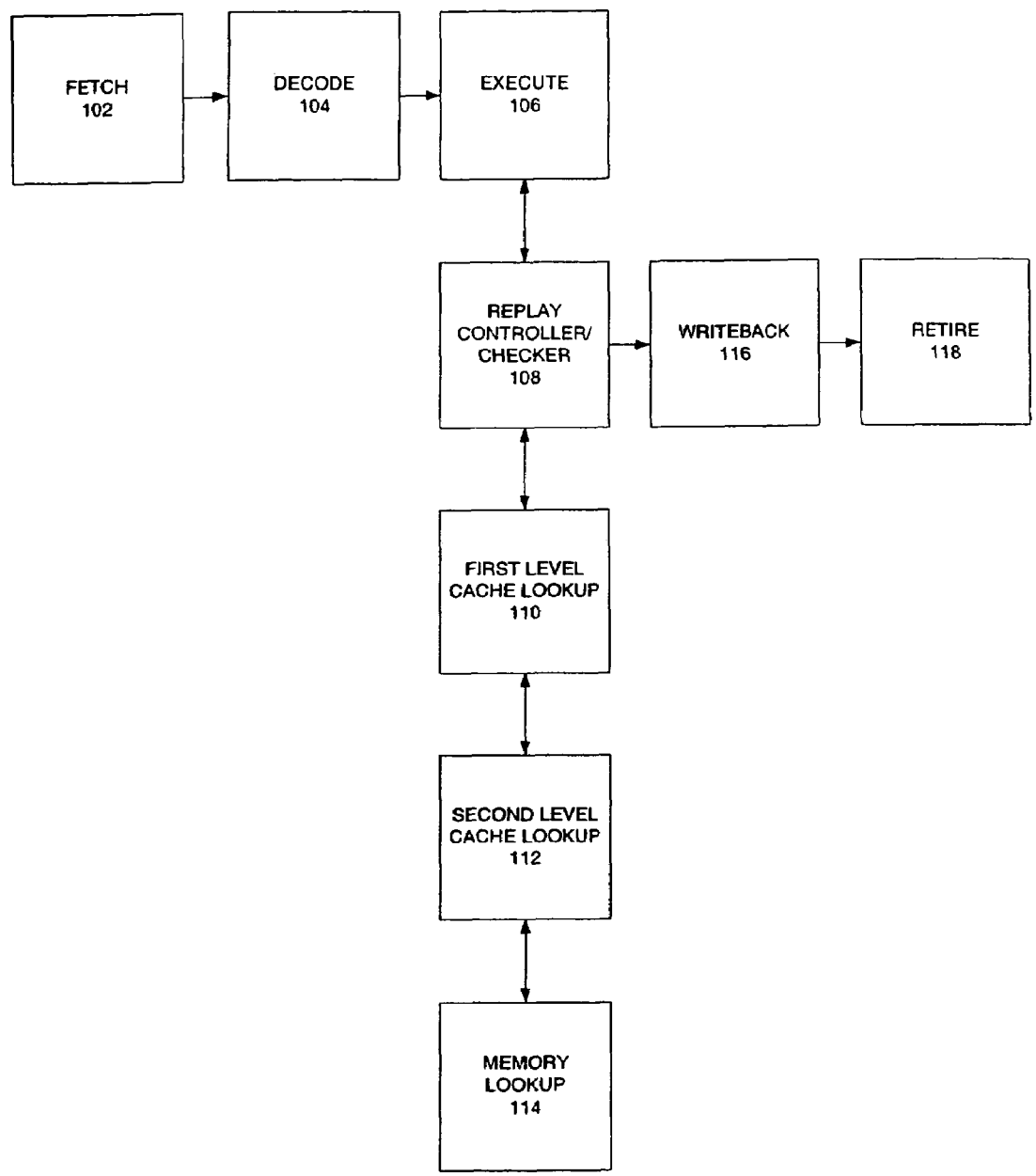
FIG. 1A is a block diagram illustrating a conventional prior art data speculation routine.
Figure 1B:
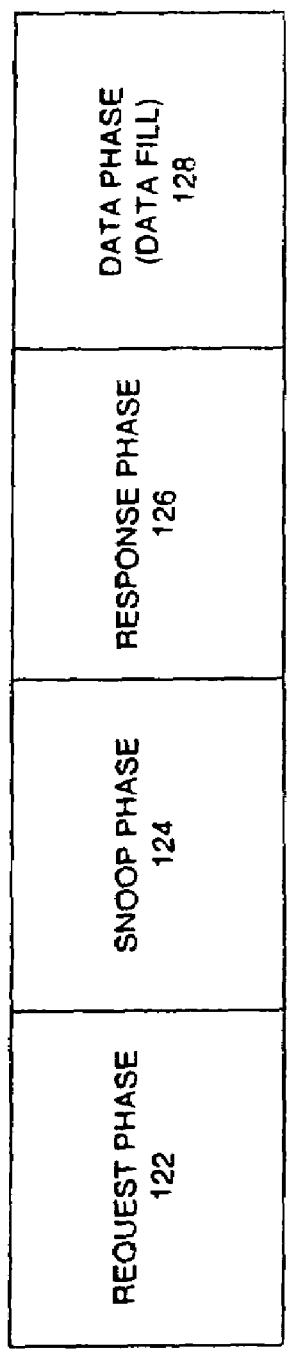
FIG. 1B is a block diagram illustrating a conventional prior art external transaction behavior of a request.
Figure 1C:
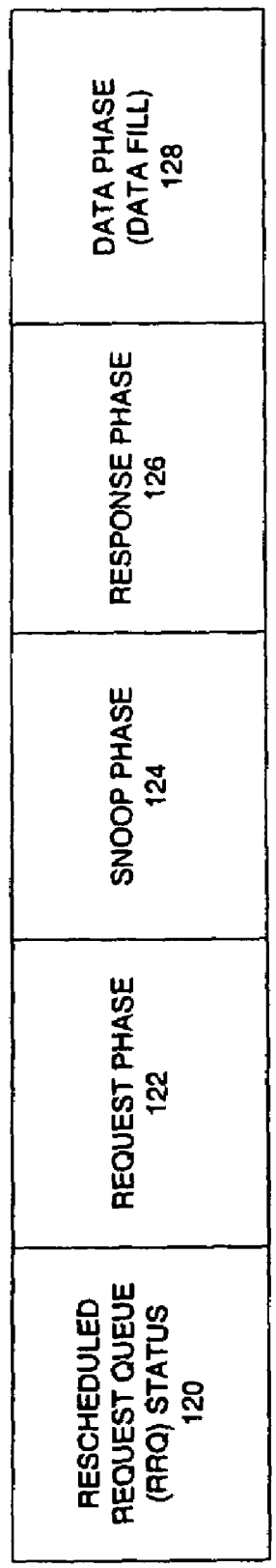
FIG. 1C is a block diagram illustrating a conventional prior art external transaction behavior of a request.

A method and apparatus are described for improving load use latency using an early data return mechanism. Various embodiments of the present invention provide for improving processor performance by improving load use latency using an early data return indication from the memory controller to the processor.

According to one embodiment, the early data return or early data ready (EDRDY) mechanism may be used to improve the performance of processors, including hyper-threaded or multi-threaded processors. A typical multi-threaded processor may include multiple threads or logical processors, sharing the same resource. According to one embodiment, the EDRDY mechanism may be used to provide an EDRDY indication or signal to a resource scheduler including a rescheduled request queue (RRQ) to re-execute a request, which may include instructions or load micro-operations (load or load uops), that has been waiting for the data. According to one embodiment, the resource scheduler may include a variety of resource schedulers including, for example, the RRQ, which may be used to prevent uops from re-executing unnecessarily. Other similar resource schedulers are contemplated; however, RRQ may be used throughout the disclosure as an example for clarity and simplification.

According to one embodiment, the EDRDY indication may be provided to the RRQ one or more bus clocks prior to a typical data ready (DRDY) indication or signal to allow the re-execution the load request from the RRQ, in turn having the load interrogate the data cache, such as the first level cache (FLC), immediately subsequent to when the FLC is filled with the data retrieved from memory. According to one embodiment, the load may hit the FLC while the data is being filled into the FLC to avoid wasting valuable bus clocks and execution bandwidth, resulting in improved processor speed and performance.

Typically, (1) the data may be found in the FLC and the request may be completed; (2) the data may be found in the second level data cached (SLC) and that data may be filled into the FLC, and the request may be completed; or (3) the data may not be located in either of FLC or SLC, and may be retrieved from memory and filled into the FLC. According to one embodiment, one or more bus clocks before the data is ready to be filled into the FLC (e.g., one or more bus clocks before the DRDY indication may be provided), an EDRDY indication may be provided via the bus interface unit to the RRQ to re-execute the load. According to one embodiment, the load may then be released and scheduled for access to the FLC via, for example, an instruction queue and a scheduler. In the meantime, according to one embodiment, the DRDY indication may be provided via the bus interface, and the data may be filled into the FLC, for example, at or immediately prior to when the load request accesses the FLC. According to one embodiment, the data may be found and the transaction may be completed.

According to one embodiment, a memory controller having an EDRDY mechanism may be coupled with one or more components including the processor and one or more memory devices. The processor, according to one embodiment, may include the RRQ and an execution core or unit. The execution unit may include or be coupled with one or more levels cache, such as FLC and SLC. According to one embodiment, the memory controller may be responsible for processing and/or servicing memory requests, such as requests for data, issued by one or more system components. According to one embodiment, the memory controller may be coupled with the processor via a front side bus (FSB). According to one embodiment, the EDRDY indication may be provided to the RRQ via a bus interface unit coupled with the FSB and the RRQ.

According to one embodiment, using the EDRDY mechanism, including the EDRDY indication process, may result in a significant decrease of data load latency and a significant increase in processor performance. According to one embodiment, the processors may include a variety of processor architectures, including multi-threaded processors. According to one embodiment, in a multi-threaded processor, the EDRDY mechanism may be implemented in any certain number of threads of the multi-threaded processor, while letting other threads function as usual.

As discussed above, the resource scheduler may include a variety of resource schedulers including the RRQ and other similar schedulers. According to one embodiment, a flexible instruction scheduling mechanism may be used to schedule the instruction to be aligned correctly with data availability. Furthermore, the resource scheduler may not be of the replay variety. According to another embodiment, data availability may be provided by performing "pre-lookup" rather than replaying the load requests. The pre-lookup-based mechanism may be additionally beneficial for low-power consumption and high-performance processor architectures.

In the following description, numerous specific details are set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various steps. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskettes, optical disks, CD-ROMs, magneto-optical disks, ROMs, RAMs, EPROMs, EEPROMs, magnetic or optical cards, flash memory, or another type of media/machine-readable medium suitable for storing electronic instructions. For example, a flexible general-purpose processor may be used to implement the EDRDY data return indication mechanism, and the implementation may be performed using field programmable grid array (FPGA), i.e., a field of gates being programmed using software.

Figure 2:
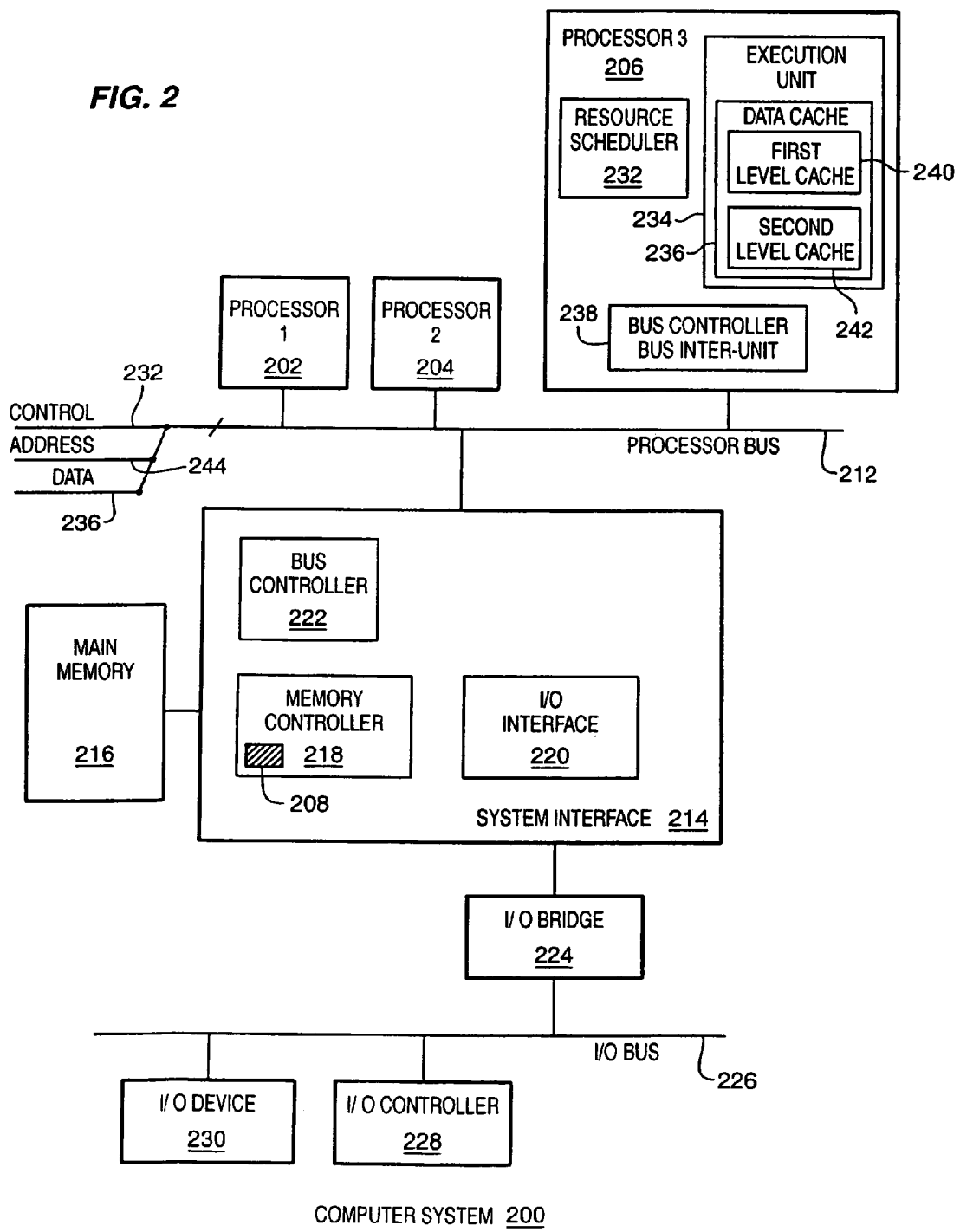
FIG. 2 is a block diagram illustrating an embodiment of a computer system.

FIG. 2 is a block diagram illustrating an embodiment of a computer system. The computer system (system) includes one or more processors 202-206. According to one embodiment, processors 202-206 may include any variety of general-purpose and specific-purpose processors, including single-threaded and/or multi-threaded processors. According to one embodiment, processors 206 may also include a data cache 236 including one or more levels of cache, such as first level cache (FLC) 240 and second level cache (SLC) 242. Furthermore, the processor 206 may also include a bus controller or bus interface unit (BIU) 238 to direct interaction with the processor bus 212.

Front side bus (FSB) or processor bus or host bus 212 may be used to couple the multi-threaded processors 202-206 with the system interface 214. Processor bus 212 may include a control bus 232, an address bus 244, and a data bus 236. Control bus 232, address bus 244, and data bus 236 may be point-to-point or multipoint/multidrop bi-directional buses, e.g., connected to three or more bus agents, as opposed to a point-to-point bus, which may be connected only between two bus agents.

System interface 214 (or chipset) may be connected to the FSB 212 to interface other components of the system 200 with the FSB 212. For example, system interface 214 may includes a memory controller 218 for interfacing a main memory 216 with the processor bus 212. According to one embodiment, the memory controller 218 may include an embodiment of early data return or ready (EDRDY) mechanism 208. According to one embodiment, the EDRDY mechanism 208 may be used to transmit an early indication of data readiness one or more bus clocks before the data may be ready to be transmitted to the processor 206. Stated differently, using the EDRDY mechanism, the EDRDY indication may refer to the memory chips already being accessed and the data being in the process of transmission to the memory controller and re-packeted for transmission on the FSB. The data may then be filled into the data cache 236, such as into the FLC 240, coupled with or residing in the execution unit 234 of the processor 206. According to one embodiment, processor 206 may include a resource scheduler 232, which may include, but is not limited to, for example, a rescheduled replay queue (RRQ) to prevent load micro-operations from re-executing unnecessarily. The RRQ may have been used in this disclosure interchangeably with the resource scheduler 232 as an example for the purposes of clarity and simplicity. The resource scheduler 232 (e.g., RRQ or the equivalent) may receive the EDRDY indication or signal from the memory controller 218 via the BIU 238 to drain the RRQ 232 of any requests which may include inserting of the data into the data cache 236.

Main memory 216 typically includes one or more memory cards and a control circuit (not shown). System interface 214 may also include an input/output (I/O) controller 220 to interface one or more I/O bridges or I/O devices with the processor bus 212. For example, as illustrated, the I/O controller 220 may interface an I/O bridge 224 with the processor bus 212. I/O bridge 224 may operate as a bus bridge to interface between the system interface 214 and an I/O bus 226. One or more I/O controllers and/or I/O devices may be connected with the I/O bus 226, such as I/O controller 228 and I/O device 230, as illustrated. I/O bus 226 may include a Peripheral Component Interconnect (PCI) bus or other type of I/O bus. According to one embodiment, the data returned via the I/O bus 226 may also generate EDRDY indications. For example, I/O device 230 may provide an EDRDY indication to the system interface 214 via I/O bus 226 and I/O bridge 224. According to one embodiment, the system interface 214 may transfer the EDRDY indication via processor bus 212 to RRQ 232 in processor 206.

System 200 may include a dynamic storage device, referred to as main memory 216, such as a random access memory (RAM) or other memory coupled to the processor bus 212 for storing information and instructions to be executed by the processors 202-206. Main memory 216 also may be used for storing temporary variables or other intermediate information during execution of instructions by the processors 202-206. System 200 may include a read only memory (ROM) and/or other static storage device coupled to the processor bus 212 for storing static information and instructions for processor 210.

Main memory 216 or dynamic storage device may include magnetic disk or optical disc for storing information and instructions. I/O device 230 may include a display device (not shown), such as a cathode ray tube (CRT) or Liquid Crystal Display (LCD), for displaying information to an end user. For example, graphical and/or textual indications of installation status, time remaining in the trial period, and other information may be presented to the prospective purchaser on the display device. I/O device 230 may also include an input device (not shown), such as an alphanumeric input device, including alphanumeric and other keys for communicating information and/or command selections to processor 210. Another type of user input device includes cursor control, such as a mouse, a trackball, or cursor direction keys for communicating direction information and command selections to the processors 202-206 and for controlling cursor movement on the display device.

System 200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 200 may be coupled with a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 200 will vary from implementation to implementation depending upon numerous factors, such as price constraints, performance requirements, technological improvements, and/or other circumstances.

It should be noted that the embodiments described herein may be performed under the control of a programmed processor or may be fully or partially implemented by any programmable or hardcoded logic, such as Field Programmable Gate Arrays (FPGAs), TTL logic, or Application Specific Integrated Circuits (ASICs), for example. Additionally, the embodiments may be performed and/or implemented by any combination of programmed general-purpose computer components and/or custom hardware components. Nothing disclosed herein should be construed as limiting the present invention to a particular embodiment.

Figure 3:
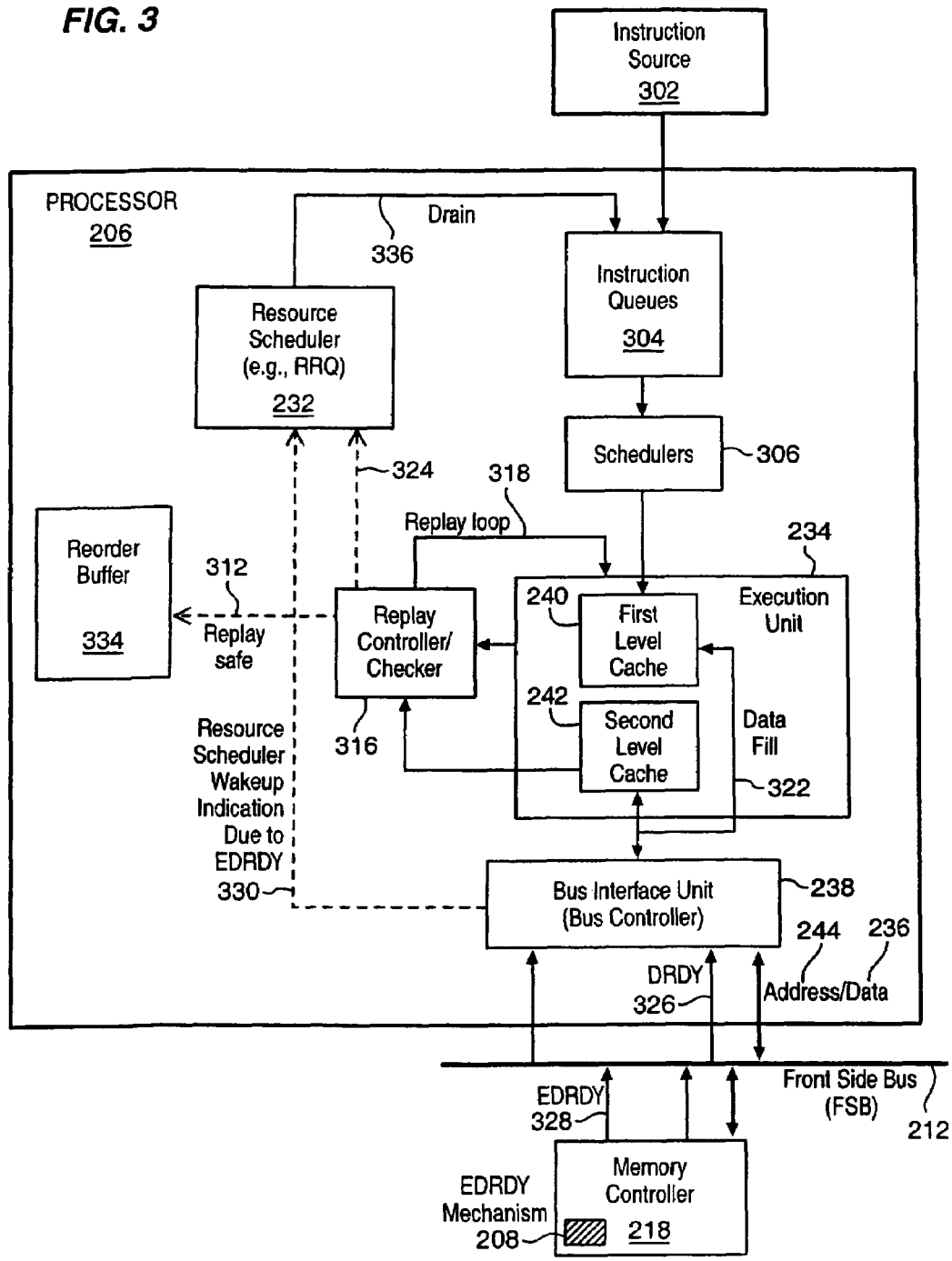
FIG. 3 is a block diagram illustrating an embodiment of an early data return mechanism.

FIG. 3 is a block diagram illustrating an embodiment of an early data return mechanism. As illustrated, a computer system (system) 200 may include a processor 206 coupled with a memory controller 218 via a host bus or processor bus or front side bus (FSB) 212. According to one embodiment, the processor 206 may be formed as a single integrated circuit. According to another embodiment, multiple integrated circuits may together form the processor 206, and according to yet another embodiment, hardware and software routines (e.g., binary translation routines) may together form the processor 206. The processor 206 may be a single-threaded or multi-threaded processor. According to one embodiment, the memory controller 218 may provide data for requests including instructions or load micro-operations (load or load uops) to the processor 206 via the FSB 212.

The processor 206 may be coupled with an instruction source 302, including an instruction fetch unit, an instruction decoder, and Register Alias Table (RAT), to receive instructions, such as memory load instructions or load uops. One or more requests received from the instruction source 302 may pass through and/or temporarily stored into an instruction queue 304.

As illustrated, the instruction queue 304 may be coupled with a scheduler 306. According to one embodiment, the scheduler 306 may schedule and dispatch requests received from the instruction queue 304 when the requests are ready to be executed and resources are available to perform the execution. The scheduler 306 may forward the requests in a continuous stream of instructions or loads to an execution unit 234. According to one embodiment, the execution unit 234 may execute the received loads. Execution unit 234 may be an arithmetic logic unit (ALU), a floating point ALU, a memory unit for performing memory loads (memory data reads) and stores (memory data writes). According to one embodiment, the execution unit 234 may be a memory load unit for loading data stored in a memory device, such as the main memory 216 of FIG. 2, to register, e.g., a data read from memory.

According to one embodiment, the execution unit 234 may include and/or be coupled with one or more memory devices, systems, or cache, such as first level cache (FLC) 240 and second level cache (SLC) 242. A cache may include all cache-related components including cache memory, cache TAG memory, and hit/miss logic that may be used to determine whether requested data may be found in the cache. According to one embodiment, FLC 240 may be the fastest memory cache located on the same processor 206 as the execution unit 234 and the data may be retrieved from the FLC 240 in about four (4) clock cycles. According to one embodiment, accessing SLC 242 may be 4-8 times slower than accessing FLC 240 (e.g., in the twenty-five (25) clock cycles range), but SLC 242 may also be located on the same processor 206 as the FLC 240 and the execution unit 234. According to one embodiment, the next level of memory device may be the main memory, such as the main memory 216 of FIG. 2.

According to one embodiment, the processor 206 may include or be coupled with a bus interface unit 238 coupled with the memory controller 318 via the FSB 212. The system 200 may also include an address bus 244 and data bus 236 as described with reference to FIG. 2. According to one embodiment, data for the request received from the instruction source 302 via the instruction queue 304 and the scheduler 306 may be found in the FLC 240 in the execution unit 234. According to one embodiment, if the data is not found in the FLC 240, the execution unit 234 may attempt to locate the desired data in SLC 242. If the data is located at SLC 242, the data may be retrieved from the SLC 242 and loaded into the FLC 240, and the may be used or stored in lower level of memory devices for future use. When the data is not found in either one of the levels of cache (e.g., FLC 240 and SLC 242) of the execution unit 234, the data may then be sought in various ways until the data for the instruction is located.

Typically, a replay system including a replay controller/checker (checker) 316 and a replay loop 318 may be invoked if the data is not found in the FLC 240. One replay may be incurred, however, if the data is found in the SLC 242 and is fetched from the SLC 242 to the FLC 240. The replay checker 316 may be used to determine which of the requests has executed properly, so that the properly-executed requests may be declared as replay safe requests 332 and may be forwarded to a reorder buffer 334. The contents of the reorder buffer 334 may be delivered into a separate retirement unit to ensure that the contents are retired in programmatically correct order.

According to one embodiment, the processor 206 may include a resource scheduler 232. The resource scheduler 232 may include, for example, a rescheduled replay queue (RRQ) or equivalent to, for example, prevent load uops from re-executing unnecessarily. It is contemplated that the resource scheduler 232 may not be limited to the RRQ, which is used here as an example, and may include any variety of instruction scheduling mechanisms to, for example, schedule the instruction so that it may be aligned correctly with data availability. Furthermore, according to one embodiment, the scheduling mechanism may not be of replay variety, and may provide data availability by performing pre-lookup as opposed to replaying the instruction. According to one embodiment, after a certain number of replay loops 318, the request for which the data was not found in the FLC 240 or the SLC 242 may be temporarily stored in the resource scheduler 232 until the data may be located. For example, an indication or signal mechanism, such as data return or ready (DRDY) indication 326, may be used to inform the resource scheduler 232 via the execution unit 234 and the replay checker 318 as illustrated by the arrow referencing wakeup 324. DRDY indication 326 refers to a data indication that occurs when the data is ready to be loaded into the FLC 240 as illustrated by the arrow referencing data fill 322.

According to one embodiment, an early data return or ready (EDRDY) mechanism 208 may provide an EDRDY indication 328 to transform into an EDRDY-based resource scheduler wakeup indication 330 to the resource scheduler 232 to wakeup the resource scheduler 232 to be drained of requests one or more bus clocks prior to a typical DRDY indication 326. Stated differently, according to one embodiment, EDRDY mechanism 208 in the memory controller 218 may be used to predict the DRDY indication 326 one or more bus clocks prior to the actual DRDY indication 326. EDRDY indication 328 may refer to informing the resource scheduler 232 about the readiness of the data prior to the data being ready, e.g., prior to the DRDY indication 326 referring to the readiness of the data to be filled into the FLC 240. According to one embodiment, resource scheduler 232 may be informed using the EDRDY indication 328 transformed into the EDRDY-based resource scheduler wakeup indication 330 via the bus interface unit 238. According to one embodiment, EDRDY indication 328 may be received using the EDRDY mechanism 208 from the memory controller 218 via the FSB 212.

According to one embodiment, the memory controller 218 coupled to one or more memory devices, such as the main memory 216, and one or more processors, such as the processor 206, may process or service instruction requests from instruction sources, such as the instruction source 302. According to one embodiment, the EDRDY mechanism 208 of the memory controller 218 may, as discussed above, provide an early indication of data being ready to be filled 322 into the FLC 240. According to one embodiment, the EDRDY indication 328 may be one or more bus clocks before the DRDY indication 326. According to one embodiment, the DRDY indication 326 may refer to the response phase of the data and thus, the beginning of the data phase, while the EDRDY indication 328 may be referred to as the pre-response phase to be used to start the process of waking up or signaling 330 the RRQ 232 and initiating the resource scheduler drain 336 while the data fill 322 into the FLC 240 occurs. According to one embodiment, the resource scheduler drain 336 may occur prior to the filling of the data 322 into the FLC 240.

According to one embodiment, by commencing the resource scheduler drain 336, for example, one or more bus clocks earlier than the DRDY indication 326, the latency delay between the point at which data is written into the FLC 240 and the point at which the load accesses the FLC 240 to retrieve the data may be eliminated. For example, according to one embodiment, at a bus ratio of twenty-four (24), the EDRDY-based waking up 330 of the resource scheduler 232 may occur 24 core clocks earlier than a DRDY-based resource scheduler wakeup 324. This may cover, for example, a 20-clock window where the data may be written to the FLC 240 before the load from the resource scheduler 232 accesses the data. Furthermore, according to one embodiment, to avoid the resource scheduler wakeup and the subsequent load request from accessing the FLC 240 prior to the requested data being loaded into the FLC 240 and thus replay, a bus-ratio-dependent delay block (delay block) may be used to align the filling of the FLC 240 with the data and the request replay. For example, according to one embodiment, the delay block may delay the EDRDY indication 328 to the core by four (4) clocks, resulting in an alignment of the request and the corresponding data.

According to one embodiment, using the EDRDY mechanism 208 for providing the EDRDY indication 328 may considerably improve processor performance. According to one embodiment, the use of delay block may further improve processor performance. According to one embodiment, the use of EDRDY mechanism 208 may improve the performance of various data loads using both the cacheable and non-cacheable memory.

According to one embodiment, memory latencies in bus clocks, such as twenty (20) bus clocks, may not relate to the processor core, as the processor core may operate at a different clock frequency than the external bus. The processor "bus ratio" may be referred to the relationship between the processor's external bus frequency as opposed to the memory channels bus frequency, which may be different than the processor's external bus speed and the processor's core operating frequency. Stated differently, bus ratio may refer to the ratio of the processor core clock frequency to the processor external bus frequency. For example, assuming the processor 206 is operating at a frequency of 4.8 GHz, the processor would have a bus ratio of 24, which may in turn imply that the memory latency seen by the processor core, which may, for example, be 20 bus clocks, may be four hundred and eighty (480) core clocks.

According to one embodiment, the processor 206 may have a fixed number of core clocks required to latch the first chunk of transaction data on the pins and transfer that data to the FLC cache 240. Analogously, there may also be a fixed number of core clocks required to vaporize the core unit, perform the resource scheduler drain 336, and re-execute the load uop. According to one embodiment, the time required for the latter may be larger than the time required for the former by, for example, approximately 20 core clocks. EDRDY mechanism 208 may be used to retrieve the data back from memory in a relatively short amount of time and the load uop may quickly utilize the updated FLC data, resulting in improved processor performance by reducing load latency.

Figure 4:
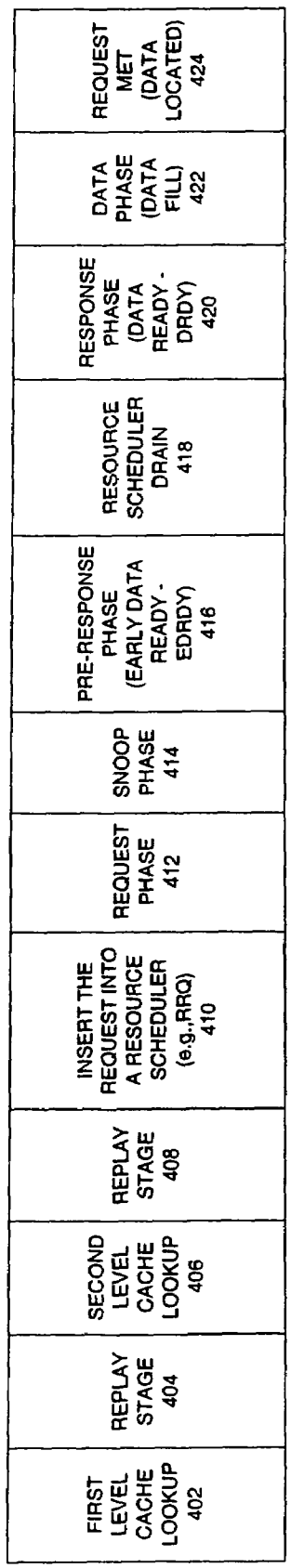
FIG. 4 is a block diagram illustrating an embodiment of an early data return mechanism.

FIG. 4 is a block diagram illustrating an embodiment of an early data return mechanism. FIG. 4 illustrates a simplified use of the early data ready (EDRDY) mechanism when data to fulfill a request of an instruction or load micro-operation (load uops) is not found. As illustrated, a lookup for data in a first data cache (FLC) is performed by the request at the FLC lookup stage 402 in response to the request received. As the data not found in the FLC, a replay of the request may be performed at the replay stage 404. A lookup for the data in a second data cache (SLC) may be performed by the request at the SLC lookup stage 406. With no data found in the SLC either, another replay loop may be performed at the replay stage 408. According to one embodiment, the number of replay loops at this stage may vary depending on various factors, such as any system requirements or predetermine criteria. For example, the number of replay loops maybe limited to three loops after which, the request may be placed into a resource scheduler (e.g., rescheduled replay queue (RRQ)) 410 to wait for the data to be retrieved from memory. According to one embodiment, the FLC lookup and the SLC lookup may be initiated in parallel, so that if a) there is a hit in the FLC, the SLC results can be abandoned or, failing that, b) the request may be replayed and a SLC hit may be received, which may fill the FLC in time for the replayed request to re-look-up the FLC or, failing that, c) data may be requested from the memory.

According to one embodiment, as the request is placed in the resource scheduler 410, the transaction begins by making an external bus request at the request phase 412. The transaction then enters the snoop phase 414 during which cache coherency is maintained throughout the system. According to one embodiment, before the data may be ready to be filled into the FLC, the transaction may enter into the pre-response phase 416 providing an early indication (EDRDY indication or signal) using the EDRDY mechanism that the data is ready will soon be filled into the FLC. Once the EDRDY indication is provided to the resource scheduler, the resource scheduler is drained 418 of the request so that the request including an instruction or load uops may be forwarded to the execution unit to seek the data about to be loaded into the FLC.

According to one embodiment, the pre-response phase 416 may happen one or more bus clocks prior to the response phase 420, and the draining of the resource scheduler 418 and the transaction entering into the response phase 420 may happen simultaneously. Draining of the resource scheduler 418 may refer to forwarding the request into the execution unit. According to one embodiment, at the same time while the resource scheduler is being drained 418, the transaction may enter into the response phase 420 followed by the data phase 422. The data phase, according to one embodiment, may refer to the filling of the FLC with the data retrieved from the memory via the memory controller. Finally, the transaction may be completed when the request is met 424, e.g., when the data is located in the FLC by the instruction or load uops.

Figure 5:
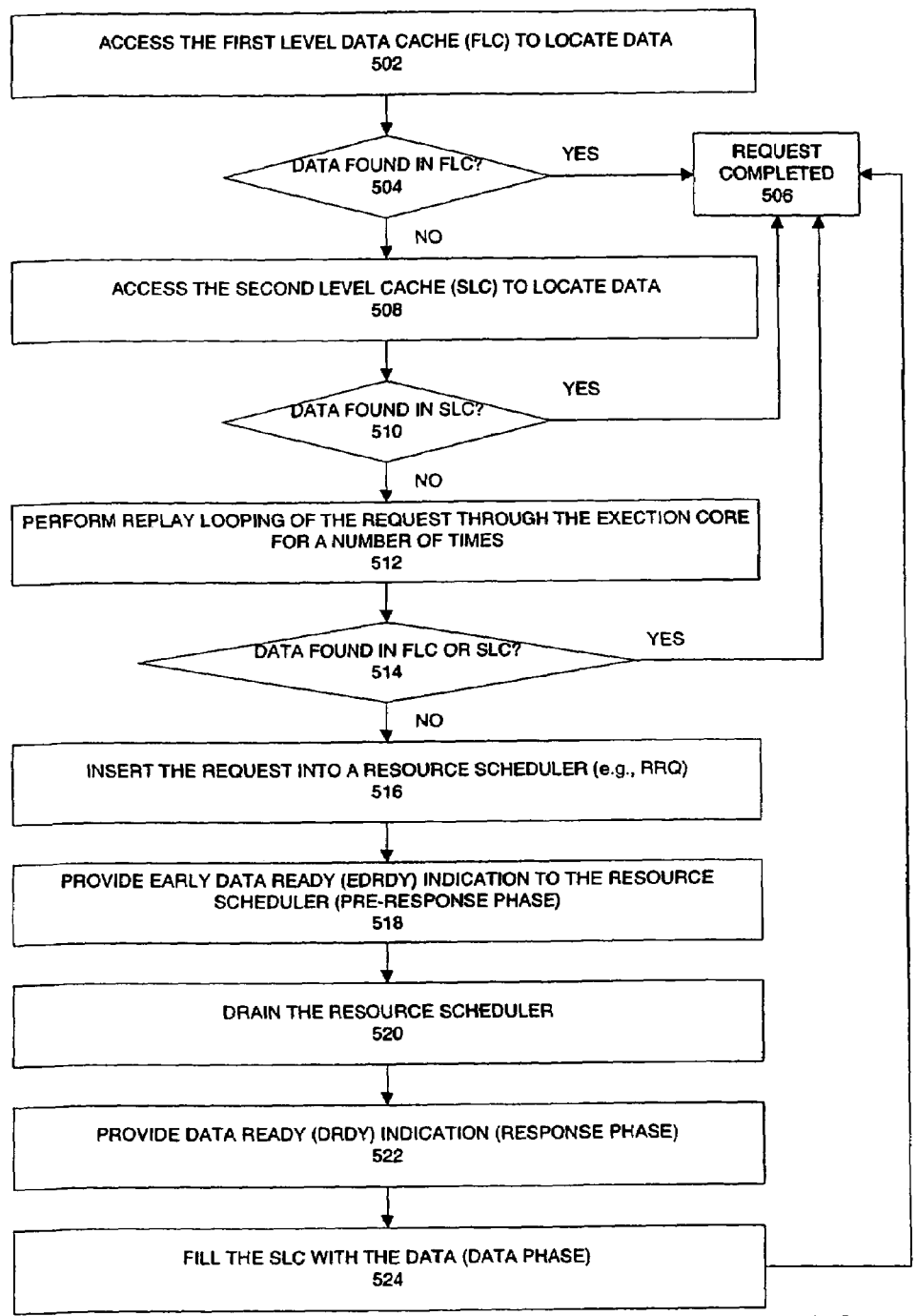
FIG. 5 is a flow diagram illustrating an embodiment of an early data return process.

FIG. 5 is a flow diagram illustrating an embodiment of an early data return process. At processing block 502, the first level data cache (FLC) may be accessed for data in response to a request received. The request may include one or more instruction or one or more load micro-operations (load uops) for the data. According to one embodiment, the FLC may be included in or coupled with the execution unit of the processor. At decision block 504, the FLC response may be determined. If the data is found at the FLC, the request may be completed at processing block 506. If the data is not found at the FLC, the access phase of the transaction may continue with the access of the second level data cache (SLC) at processing block 508. According to one embodiment, the access of the SLC may be performed with by replay looping the request to the SLC. As with the FLC, according to one embodiment, the SLC may be included in or coupled with the execution unit of the processor. At decision block 510, the FLC response may be determined. If the data is found at the SLC, the request may be completed at processing block 506. According to one embodiment, both the FLC and the SLC may be determined. If the data is not found at the SLC, the transaction may continue with replaying at processing block 512.

According to one embodiment, the replaying of the request, e.g., the instruction or the load uops, may continue with accessing of the FLC and the SLC for the data. According to one embodiment, the replaying may be limited, such as limited to three (3) replays. According to one embodiment, if the replaying is allowed and is limited to a certain number of replays, at decision block 514, the response of both the FLC and the SLC may be determined. If the data is found in either FLC or SLC, request may be met at processing block 506. If the data is not found in either FLC or SLC, the request may be inserted in a resource scheduler (e.g., a rescheduled replay queue (RRQ) or equivalent) at processing block 516. According to one embodiment, replaying may be entirely eliminated and the request may be directly inserted into the resource scheduler.

According to one embodiment, the request may stay in the resource scheduler for the data to become available in the FLC. According to one embodiment, using the early data ready (EDRDY) mechanism of the memory controller, an EDRDY indication may be provided to the RRQ at processing block 518. According to one embodiment, EDRDY indication may be considered a part of the pre-response phase and may include providing the indication to the RRQ that the data may soon be ready. According to one embodiment, EDRDY indication, which may serve as a early indication signal prior to readiness of the data, may be provided to the resource scheduler one or more bus clocks prior to the data ready (DRDY) indication, which may refer to the readiness of the data. Once the EDRDY indication is received, the resource scheduler may be drained of the request in anticipation of the readiness of the data at processing block 520.

According to one embodiment, the data may then be ready and a DRDY indication may be provided at processing block 522. Then, the data may be filled into the FLC at processing block 524. With the data being present in the FLC, the request may be completed at processing block 506. According to on embodiment, the filling of the FLC with the data may be performed simultaneously with the draining of the RRQ or, according to another embodiment, the filling of the FLC may be performed after the draining of the RRQ, but before accessing the FLC.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
generating one or more requests waiting for data to be loaded into a data cache including a first level cache (FLC);
receiving the one or more requests from one or more instruction sources;
scheduling the one or more requests;
passing the one or more requests on to an execution unit having the data cache;
checking contents of the data cache;
replaying to the one or more requests if the data is not located in the data cache;
storing the one or more requests that are replay safe;
detecting readiness of the data of one or more bus clocks prior to the data being ready to be transmitted to a processor; and
transmitting an early data ready indication to the processor to drain the one or more requests from a resource scheduler.

2. The method of claim 1, further comprising:
receiving the transmitted early data ready indication from a memory controller; and
transmitting the early data ready indication to the resource scheduler having a rescheduled request queue (RRQ).

3. The method of claim 1, wherein the data cache further comprises a second level cache (SLC).

4. The method of claim 1, further comprising:
receiving a data ready indication; and
filling the data cache with the data.

5. The method of claim 1, further comprising replaying the one or more requests to continue to snoop the data cache for the data, the replaying comprising repeating the one or more requests through the data cache for a predetermined number of times.

6. The method of claim 1, wherein the one or more requests comprises at least one of an instruction and a load micro-operation.

7. A machine-readable medium having stored thereon data representing sets of instructions which, when executed by a machine, cause the machine to:
generate one or more requests waiting for data to be loaded into a data cache including a first level cache (FLC);
receive the one or more requests from one or more instruction sources;
schedule the one or more requests;
pass the one or more requests on to an execution unit having the data cache;
check contents of the data cache;
replay to the one or more requests if the data is not located in the data cache;
store the one or more requests that are replay safe;
detect readiness of the data of one or more bus clocks prior to the data being ready to be transmitted to a processor; and
transmit an early data ready indication to the processor to drain the one or more requests from a resource scheduler.

8. The machine-readable medium of claim 7, wherein the sets of instructions, when executed by the machine, further cause the machine to:
receive the transmitted early data ready indication from a memory controller; and
transmit the early data ready indication to the resource scheduler having a rescheduled request queue (RRQ).

9. The machine-readable medium of claim 7, wherein the data cache further comprises a second level cache (SLC).

10. The machine-readable medium of claim 7, wherein the sets of instructions, when executed by the machine, further cause the machine to:
receive a data ready indication; and
fill the data cache with the data.

11. The machine-readable medium of claim 7, wherein the sets of instructions, when executed by the machine, further cause the machine to:
replay the one or more requests to continue to snoop the data cache for the data, the replaying comprising repeating the one or more requests through the data cache for a predetermined number of times.

* * * * *